Figure 1:
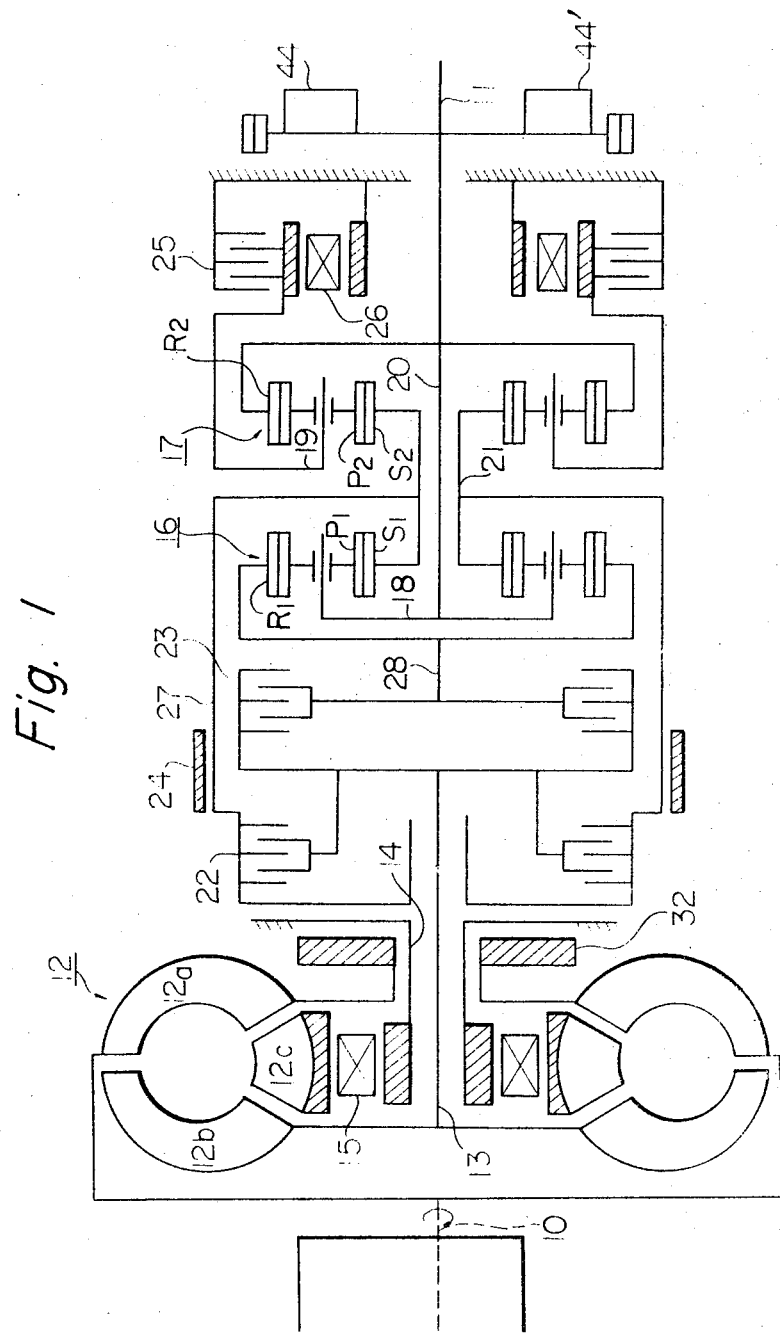

United States Patent

Irie

[15] 3,667,323
[45] June 6, 1972

[54] HYDRAULIC CONTROL SYSTEM FOR AUTOMATIC TRANSMISSION

[72] Inventor: Namio Irie, Yokohama, Japan
[73] Assignee: Nissan Motor Company, Limited, Kanagawa-ku, Yokohama City, Japan
[22] Filed: Apr. 28, 1970
[21] Appl. No.: 32,527

[30] Foreign Application Priority Data

Apr. 30, 1969 Japan..................................44/32720

[52] U.S. Cl. ................................74/752 C, 74/864, 74/868, 74/869
[51] Int. Cl........................................F16h 5/42, B60k 21/00
[58] Field of Search ..........................74/863, 864, 867–869, 74/752 C

[56] References Cited

UNITED STATES PATENTS 3,398,607  8/1968  Chana.................................74/868 X
3,446,098  5/1969  Searles...................................74/869

FOREIGN PATENTS OR APPLICATIONS 1,189,637  4/1970  Great Britain..........................74/863

Primary Examiner—Arthur T. McKeon
Attorney—John Lezdey

[57] ABSTRACT

A hydraulic control system for an automotive automatic transmission using a planetary gear set, the control system having a reverse reaction brake which is applied by the motion of a manual selector valve when the selector valve is set to the neutral position with the engine operating and which is prevented from being applied when the vehicle is being driven in a forward direction and the selector valve is shifted from the drive to the neutral position. The manual selector valve is controlled by a governor pressure which may be connected direct to the source of hydraulic pressure.

3 Claims, 2 Drawing Figures

HYDRAULIC CONTROL SYSTEM FOR AUTOMATIC TRANSMISSION

This invention relates to a power transmission of a motor vehicle and, more particularly, to an improved hydraulic control system of an automotive automatic transmission.

In a usual automotive automatic transmission, an input rotational power which has been carried from a prime mover such as an internal combustion engine to an input shaft is transferred to an output shaft at a selected revolution speed and with selected torque through selective actuation and release of friction elements including clutches and brakes which form part of the transmission. The clutches and brakes, in this instance, are intended to act respectively as input clutches transferring the incoming power and reaction brakes bearing the rotational reactive force. When the manual speed selector lever is held in any of the positions providing forward vehicle speeds, a forward clutch and forward brake are actuated to provide the selected forward and, when the selector lever is held in a position providing the reverse speed, then the reverse clutch and reverse brake are actuated to provide the reverse speed. It is thus necessary for effecting the forward or reverse movement of a motor vehicle to have the input clutches and reaction brakes actuated and released selectively. The forward reaction brake to provide the forward speeds is usually constructed as a one-way brake which need not be applied when any of the forward speeds is to be selected. When, therefore, the selector lever is shifted to any of the positions providing any of the forward speeds, the desired forward speed can be attained readily only by the engagement of the forward clutch, because the one-way brake at all times remains effective on the forward movement of the motor vehicle. When, on the contrary, the selector lever is shifted to the reverse position, then the one-way brake remains inoperable and the reverse can not be attained unless the reverse clutch and reverse brake are actuated concurrently.

Since all the friction elements are kept released when the selector lever is held in the neutral position in a usual automatic power transmission, the reverse clutch and reverse brake should be actuated stimultaneously when the selector lever is shifted from the neutral to the reverse position. The hydraulic pressure is thus applied to the reverse clutch and reverse brake. This will result in a retarded establishment of the reverse speed and a production of mechanical shocks.

It is therefore an object of the invention to provide an improved hydraulic control system of the nature which is adapted to smoothly establish the reverse speed immediately when the selector lever is shifted from the neutral to the reverse position. Such an object can be accomplished according to the invention without affecting the operations of the friction elements during high speed driving of the motor vehicle; the reverse brake is kept released even though the selector lever is accidentally shifted to the neutral position when the vehicle is being driven at a high speed.

Figure 2:
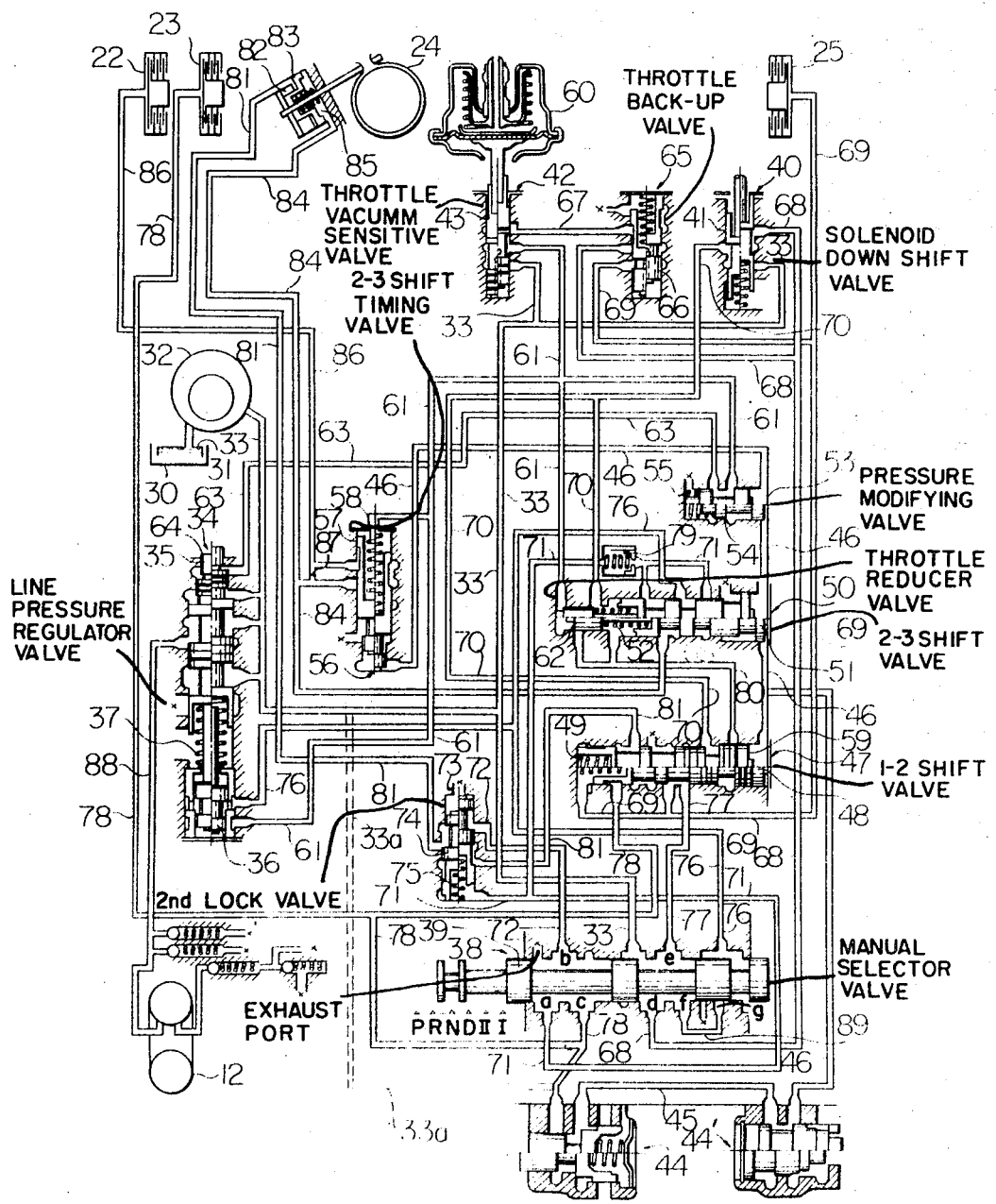

In the drawings:

FIG. 1 is a schematic view illustrating an example of a power train of an automatic power transmission of planetary gear type; and FIG. 2 is a schematic diagram illustrating a fluid circuit of a hydraulic control system implementing the invention.

The power train as shown in FIG. 1 is exemplified as using two planetary gear sets providing three forward and one reverse speeds for illustrative purposes but it will be understood that the hydraulic control system according to the invention may be used with any other types of power trains so far as the same is controlled by a hydraulic control system.

Now, the power train shown in FIG. 1 starts with a drive shaft 10 which is connected to and driven by a prime mover (not shown) such as an internal combustion engine and terminates with an output shaft 11 which is connected to and drives a propeller shaft (not shown). The input power which the drive shaft 10 receives from the prime mover is torque modulated by a torque converter 12 having a propeller or pump 12a, turbine 12b and stator 12c as customary. The torque converter 12 may be replaced with a fluid coupling, if desired.

The input power in the drive shaft 10 is carried to the propeller or pump 12a and imparts a torque to the turbine 12b which is fast on an input shaft 13. The stator 12c is secured to a stationary shaft 14 through a one-way brake 15, which serves to prevent the stator 12c from rotating in the direction opposite to the direction of rotation of the drive shaft 10; this direction of rotation of the drive shaft will be hereinafter referred to as the normal direction of rotation.

The power thus imparted to the turbine 12b is then carried to first and second planetary gear sets which are generally represented by numerals 16 and 17, respectively. The first planetary gear set 16 has rotary members including an outer ring gear $R_1$ which is internally toothed, two or more planet pinions $P_1$ which are externally meshing with the ring gear $R_1$ and a sun gear $S_1$ externally meshing with the planet pinions $P_1$. The planet pinion $P_1$ is carried by a pinion carrier 18. The second planetary gear set 17, similarly, has rotary members including an internally toothed outer ring gear $R_2$, two or more planet pinions $P_2$ externally meshing with the ring gear $R_2$ and carried by a pinion carrier 19, and a sun gear $S_2$ externally meshing with the planet pinions $P_2$. These rotary members are all rotatable concentrically about a common axis which, in the case of the gear train exemplified in FIG. 1, is in line with a rotary shaft 20 connected to the pinion carrier 18. As illustrated by way of example, the sun gears $S_1$ and $S_2$ of the first and second planetary gear sets 16 and 17, respectively are connected rigidly to each other through a hollow shaft 21. The pinion carrier 18 is connected rigidly to the ring gear $R_2$ of the second planetary gear set 17 through the shaft 20 and further to the output shaft 11.

Friction elements are provided which includes a reverse and third-speed clutch 22, a forward clutch 23, a second-speed brake 24, a reverse and first-speed brake 25, and a one-way brake 26 which is combined with the reverse and first-speed brake 25.

The reverse and third-speed clutch 22 is operatively connected between the input shaft 13 and the hollow shaft 21 of the sun gears $S_1$ and $S_2$ through a brake drum 27 and the forward clutch 23 is operatively connected between the input shaft 13 and the ring gear $R_1$ of the first planetary gear set 17 through an intermediate shaft 28, as shown. The second-speed brake 24 is operatively connected between the clutch 22 and the hollow shaft 21 and forced against the brake drum 27 to hold the sun gears $S_1$ and $S_2$ stationary when applied. The reverse and first speed brake 25, on the other hand, is operatively connected to the pinion carrier 19 of the second planetary gear set 17 and, when applied, holds the planet pinions $P_2$ stationary. The one-way brake 26 acts to prevent the pinion carrier 19 from rotating in the direction opposite to the normal direction of rotation of the drive shaft 10.

When, now, the manual speed selector (not shown) is shifted from the neutral to the first-speed position, then the clutch 23 is coupled so that the ring gear $R_1$ of the first planetary gear set 16 is driven. A power providing the first forward speed is delivered from the pinion carrier 18 of the first planetary gear set 16 to the output shaft 11. In this instance, the pinion carrier 19 tends to rotate in the direction opposite to the normal direction previously defined because of the running resistance carried thereto from the wheel axles (not shown). Such tendency of the pinion carrier 19 is, however, blocked by the action of the one-way brake 26 and thus streamlined shifting to the first speed can be effected. When, however, the selector lever is shifted from the neutral to the reverse position, then the clutch 22 is coupled and the brake 25 applied. The sun gears $S_1$ and $S_2$ are thus driven by the input shaft 13. If, in this instance, the brake 25 is not applied, then the pinion carrier 19 will tend to rotate in the normal direction and, as a consequence, the second planetary gear set will tend to rotate in its entirety in the normal direction, obstructing the output shaft 11 from rotating in the opposite direction. This is the reason why two friction elements should be actuated concurrently for the shifting from the neutral to the reverse position. Such concurrent actuation of the two friction elements, the clutch 22 and brake 25, invites a retarded establishment of the reverse speed, as previously discussed.

The drawback of this nature as experienced where the power train as shown is used in combination with an existing hydraulic control system will be eliminated if the same power train is used together with the hydraulic control systems illustrated in FIG. 2.

The hydraulic control system as illustrated in FIG. 2 includes, as customary, an oil supply source 30 with a strainer 31 to clean the oil for an oil pump 32. The oil pump 32 is driven by the pump 12a of the torque converter 12 and delivers pressurized oil through a main hydraulic conduit 33 to a pressure regulator valve 34 with a spool 35 sliding in the upper end and a spool 36 sliding in the lower end of the valve 34. A spring 37 urges the spools in opposite directions. After pressure adjustment the hydraulic conduit is connected to a manual speed selector valve 38 provided with a slidable spool 39, to a solenoid down-shift valve 40 provided with a slidable spool 41 and to a vacuum throttle valve 42 provided with a slidable spool 43.

First and second governor valves 44 and 44', respectively, which are connected by a conduit 45, supply pressurized oil through a conduit 46 to a first-to-second speed shift valve 47, which will be hereinafter referred to as a 1–2 shift valve and which is provided with a slidable spool 48 and a spring 49, to a second-to-third speed shift valve 50 which is hereinafter referred to as a 2–3 shift valve and which is provided with a slidable spool 51 and a spring 52, to a cut-back valve 53 provided with a slidable spool 54 and a spring 55, and to a by-pass valve 56 provided with a slidable spool 57 and a spring 58. The springs 49, 52, 55 and 58 are selected in an increasing governor pressure resisting order and therefore a predetermined relatively low governor pressure in the conduit 46 applied against an end land 59 of the spool 48 of the 1–2 shift valve 47 overpowers the force of the spring 49 to move the spool 48 leftwardly in the drawing. It should be noted that all the valve spools are shown in both inactivated and activated positions, the lower halves of the spools 48, 51 and 54 in the former and the upper halves in the latter position.

The vacuum throttle valve 42 is connected through a diaphragm assembly 60 to the engine intake manifold (not shown) and throttles the pressure in the main conduit 33 to a throttle pressure which is fed through conduit 61 to the throttling end 62 of the 2–3 shift valve 50, to the upper end of the spool 57 of the by-pass valve 56 acting together with the spring 58 against the governor pressure applied on the spool 57 from the conduit 46 connected to the lower end of the valve 56, to the end land of the spool 36 of the pressure regulator valve 34 and through the cut-back valve 53 via a conduit 63 to the end land 64 of the spool 35 of the pressure regulator valve 34. The vacuum throttle valve 42 is further connected to a throttle back-up valve 65, which is provided with a spool 66, through a conduit 67 receiving the surplus oil resulting from throttling of the valve vacuum throttle valve 42. The throttle back-up valve 65 is connected through a conduit 68 to the manual selector valve 38, through a conduit 69 to the reverse and first-speed brake 25 and to the 1–2 shift valve 47, and through the conduit 68 to the solenoid down-shift valve 40. The down-shift valve 40 is connected through a conduit 70 to the 2–3 shift valve 50 and the 1–2 shift valve 47.

The manual selector valve 38 is further connected through a conduit 71 and a conduit 72 to a second-speed lock valve 73 which is provided with a spool 74 and a spring 75, to the 2–3 shift valve 50, and the regulator valve 34 through a conduit 76, and to the 1–2 shift valve 47 through a conduit 77 and a conduit 78, which is also connecting to the forward clutch 5 motor (not shown). A check valve 79 is provided which has an orifice (not identified by a numeral) in the valve head to slow down the flow of pressurized oil in the conduit 71 connecting with the 2–3 shift valve 50. A conduit 80 connects the two shift valves 47 and 50, supplying throttle pressure from the conduit 61 through the throttling end 62 of the 2–3 shift valve 50 to the 1–2 shift valve 47. The lock valve 73 connects through a conduit 81 the 1–2 shift valve 47 to the apply side 82 of a servo motor 83 of the brake band 24. The 2–3 shift valve 50 is connected through a conduit 84 to the release side 85 of the servo motor 83. The conduit 84 branches off into a conduit 86, provided with an orifice 87 and the by-pass valve 56, leading to a clutch motor (not shown) of the reverse and third-speed clutch. It should be noted, that as in the case of the spools 48, 51 and 53, the spools 35, 36, 41, 43, 57 and 74 of the respective valves 34, 40, 42, 56 and 73 are shown in both inactivated and activated positions, the right hand halves in the former and the left hand halves in the latter positions, however, the valve 65 spool 66 halves are shown in reversed positions.

The torque converter 12 receives pressurized fluid from the regulator valve 34 through a conduit 88. This circuit is provided with necessary relief valves as shown in the left-hand bottom portion of the drawing although no numerals are used for their identification.

The manual selector valve 38 has ports $a, b, c, d, e, f$ and $g$ which can be connected with the main hydraulic conduit 33 by moving the spool 39 into various positions with a selector lever (not shown). According to this invention, the selector valve 38 and the spool 39 are so constructed that the main hydraulic conduit 33 communicates with the ports $d, e$ and $f$ when the selector lever (not shown) is in the neutral position. The port $e$ is connected to the 1–2 shift valve 47 by the conduit 77. The 1–2 shift valve 47 serves as the control valve in this invention, connecting, when inactivated, the conduit 77 to the conduit 69, which therefore becomes pressurized and causes the reverse reaction brake 25 to engage. Furthermore, should the selector lever (not shown) be shifted from the first to the neutral position accidentally while driving at a high speed (at the second or third speed), the 1–2 shift valve 47 serves even in this case as the control valve by remaining in the actuated position, thus preventing the conduit 77 from communicating with the conduit 69. The reverse reaction brake 25 remains disengaged in this manner, as will be described hereinafter in more detail.

It is believed that only a brief description of the operation of the hydraulic circuit suffices, since the improvement of the invention can be applied to any kind of control system of an automatic transmission providing forward and reverse speeds. Therefore, reference is made now to Table I in which the various ports of the selector valve 38 are shown open corresponding to the positions P (parking), R (reverse), N (neutral), D (drive range), II (manual second speed range), and I (manual first speed range), and in which also the friction elements that are engaged corresponding to the above mentioned positions are indicated by a symbol "+" and those friction elements remaining inoperative by a symbol "−".

TABLE I

| Mode of operations | Operative ports of selector valve 38 | | | | | | Actuated friction elements | | | | |
|---|---|---|---|---|---|---|---|---|---|---|---|
| | | | | | | | Clutch | | Brake | | |
| | | | | | | | 22 | 23 | 24 | 25 | 26 |
| Parking | | | | d | e | | − | − | − | + | − |
| Reverse | | | | d | e | f | + | − | − | + | − |
| Neutral | | | | d | e | | − | − | − | + | − |
| Forward: | | | | | | | | | | | |
| I | | | c | d | e | | − | + | − | + | − |
| II | | b | c | d | | | − | + | + | − | − |
| Drive range: | | | | | | | | | | | |
| 1st | | | | | | | − | + | − | − | (+) |
| 2d | | a | b | c | | | − | + | + | − | (+) |
| 3d | | | | | | | + | + | − | − | − |

If the manual selector valve 38 is set to the drive range position (D), the spool 39 of the valve 38 is moved so that the line pressure conduit 33 is brought into communication with the ports $a, b$ and $c$ as seen in FIG. 2. The port $a$ is connected to the lock valve 73 and the 2–3 shift valve 50 by the conduit 71. The port $b$ is connected to the lock valve 73 by the conduit 72.

The port c is connected to the 1-2 shift valve 47 and a motor (not shown) of the forward clutch 23 by the conduit 78 (FIG 2) to engage the forward clutch 23, which serves as a forward input clutch (Table I). The power from the engine to the torque converter 12 passes through the input shaft 13 to the forward clutch 23 and is transmitted through the intermediate shaft 28 to the ring gear $R_1$ of the first planetary gear set 16. The ring gear $R_1$ causes the pinions $P_1$ to rotate in the normal direction. Therefore, the sun gear $S_1$ rotates in the reverse direction causing the sun gear $S_2$ of the second planetary gear set 17 to rotate in the reverse direction, whereby the pinions $P_2$ of the second planetary gear set 17 rotate in the normal direction. The one-way brake 26 now prevents the sun gear $S_2$ from reversing the rotation of the pinion carrier 19 and acts as a forward reaction brake. The ring gear $R_2$ of the second planetary gear set 17 rotates in the normal direction. Thus, the output shaft 11 rotating with the ring gear $R_2$ also rotates in the normal direction (FIG. 1), thereby providing a reduction ratio corresponding to a first forward speed.

As the speed of the vehicle is increased in this state, the oil pressure in the governor pressure conduit 46 applied on the end land 59 of the spool 48 also increases and overcomes the biassing force of the spring 49 of the 1-2 shift valve 47, thereby forcing the spool 48 of the 1-2 shift valve 47 to move leftwardly, whereby the main hydraulic conduit 33 communicates through the conduit 78 with the conduit 81 and with the lock valve 73. For the first forward speed, the line pressures are introduced from the conduits 71 and 72 into the lock valve 73 and the area to which the pressure from the conduit 71 is exerted is greater than the area to which the pressure from the conduit 72 is exerted, and, for this reason, the spool 74 of the lock valve 73 is urged upward to connect the now pressurized conduit 81 with the apply side 82 of the servo motor 83, thereby engaging the second-speed brake 24 (FIG. 2). The one-way brake 26 is simultaneously disengaged. As is the case with the first forward speed, the power from the input shaft 13 is transmitted through the forward clutch 23 to the ring gear $R_1$. The brake 24 holds the drum 27 stationary to prevent the rotation of the sun gears $S_1$ and $S_2$ and thus serves as a forward reaction brake. The pinions $P_1$ rotate and revolve about the sun gear $S_1$ which is now held stationary, so that the pinion carrier 18 and the output shaft 11 integral therewith rotate in the normal direction at a speed higher than the first forward speed (FIG. 1), thereby providing a reduction ratio corresponding to the second forward speed.

As the speed of the vehicle is further increased so that the oil pressure in the governor pressure conduit 46, applied on the end land of the spool 51, overcomes the combined forces of the spring 52 of the 2-3 shift valve 50 and the oil pressure from the throttle pressure conduit 61 to force the spool 51 of the 2-3 shift valve 50 to move leftwardly in the drawing, the oil pressure passing through the conduit 71 and the check valve 79 with an orifice (not identified by a numeral) into the conduit 84 and the release side 85 of the servo motor 83 to release the brake 24, and further communicates through the conduit 86 and orifice 87 with the motor (not shown) of the clutch 22 which is consequently coupled (FIG. 2) The power transmitted to the input shaft 13 is further transmitted to the ring gear $R_1$ through the forward clutch 23, and to the sun gear $S_1$ through the clutch 22. As a result, the ring gear $R_1$ and sun gear $S_1$ are interlocked with each other and rotate in the normal direction with the pinion carrier 18 and output shaft 11 rotating at the same speed as the input speed 13 (FIG. 1), thereby providing a third forward speed. In this instance, the clutches 22 and 23 serve as input clutches and no reaction is produced because the torque is not increased.

If the speed selector lever (not shown) is set to the manual second forward speed position (II) the spool 39 of the selector valve 38 is moved to cause the main hydraulic conduit 33 to communicate with the ports b, c and d (Table I). The port b communicates with the lock valve 73 through the conduit 72. Since the conduit 71 is drained, the spool 74 of the lock valve 73 is forced downward by the pressure in the conduit 72 which thereby communicates with the conduit 81 to engage the brake 24. The port c communicates with the 1-2 shift valve 47 and the motor (not shown) of the forward clutch 23 through the conduit 78, thereby engaging the forward clutch 23. The port d communicates with the solenoid down-shift valve 40 and throttle back-up valve 65 through the conduit 68. Since the circuit 71 is drained, the brake 24 remains applied even if the speed of the vehicle is increased, and the clutch 22 remains disengaged, whereby the manual second forward speed is maintained (FIGS. 1 and 2).

When the speed selector lever (not shown) is set to the manual first forward speed position (I), the spool 39 of the selector valve 38 is moved to cause the main hydraulic conduit 38 to communicate with the ports c, d and e (Table I). The port c communicates with the 1-2 shift valve 47 and the motor (not shown) of the forward clutch through the conduit 78 to engage the forward clutch 23. The conditions of communication of the port d are the same as in the case of the manual second forward speed position (II), and the port e communicates with the 1-2 shift valve 47 through the conduit 77 and, when the spool 48 of the 1-2 shift valve 47 is forced rightward by the spring 49, the inlet e communicates with the motor (not shown) of the brake 25 through the conduit 69 to engage the brake 25 (FIG. 2). Since the conduit 72 is drained, the brake 24 remains disengaged and the oil pressure in the conduit 69, together with the force of the spring 49 of the 1-2 shift valve 47, forces the spool 48 of the 1-2 shift valve 42 to hold its rightward position (the governor pressure being low at low driven shaft speeds), whereby the manual first forward speed is maintained. Since the pinions $P_2$ of the second planetary gear set 17 are now driven by the output shaft 11 because the reverse brake 25 is engaged, the sun gear $S_2$ is also driven to cause braking on the engine (FIG. 1).

If the speed selector lever (not shown) is set to the reverse position (R), the spool 39 of the selector valve 38 is moved to cause the main hydraulic conduit 33 to communicate with the ports d, e and g. The conditions of communication of the ports d and e are the same as those in the case of the manual first forward speed position and the reversed brake 25 is engaged this time. The port g communicates with the port f via a conduit 89 and with the motor (not shown) of the clutch 22 through the conduit 76, 2-3 shift valve 50 and conduits 84 and 86 by-passing the orifice 87 through the by-pass valve 56 to engage the reverse clutch 22. Simultaneously the pressure in the conduit 76 acts on the regulator valve spool 36, increasing the pressure in the hydraulic conduit 33. The power transmitted to the input shaft 13 is thus transmitted by the clutch 22 through the drum 27 to the sun gear $S_2$. Since the pinion carrier 19 is held stationary by the action of the brake 25, the pinions $P_2$ now idle away, causing the ring gear $R_2$ and output shaft 11 to rotate in the reverse direction. In this instance, the reverse clutch 22 serves as a reverse input clutch and the reverse brake 25 serves as a reverse reaction brake.

When the manual selector valve 38 is shifted to the parking position (P), the spool 39 thereof is moved to cause the ports e and d communicate with the main hydraulic conduit 33, thereby engaging the reverse brake 25 as is the case with the neutral position (N).

In the conventional automatic transmission control systems, the manual selector valve and the valve spool are constructed to close the inlet of the main hydraulic conduit thereby to disengage all the clutches and brakes when the selector valve is in the neutral position. When the selector valve is shifted from the neutral to the reverse position for backing-up, a pressurized fluid must be supplied to the reverse input clutch motor and the reverse reaction brake motor to engage the two friction elements simultaneously, requiring a considerable length of time. Furthermore, the timing for depressing the accelerator pedal is so difficult and often premature that as soon as the engagement of the friction elements is complete, the coupling (which is the torque converter in this embodiment), which has been rotating without any resistance, will suddenly receive such a resistance as to cause a shock or jerk to the vehicle. Also, the reduction ratio is greater in the power train for backingup than in the manual first forward speed, where two friction elements are engaged at the same time. Because of the higher reduction ratio, a higher torque is required and accordingly, a higher hydraulic pressure must be used to effectively engage the friction elements, the pressure builds-up to further prolong the time required for completion of the engagement.

According to the present invention, the manual selector valve is constructed to engage the reverse reaction brake even when the transmission is in the neutral position, as mentioned above. A pressurized fluid passes from the main hydraulic conduit 33 to the port $e$, conduit 77 and through the 1–2 shift valve 47 and the conduit 69 to the motor (not shown) of the reverse brake 25 motor so as to engage the brake 25, as mentioned above. As a result, the transmission is quickly set into a reversing condition, when the selector valve 38 is shifted from the neutral to the reverse position and the necessity of timing the depression of the accelerator pedal is eliminated, whereby the movement from a halt into a reverse direction is facilitated and is smoothly and quickly accomplished.

When the manual selector valve is in the neutral position, the reverse input clutch is not engaged and therefore the planetary gear set type transmission is not rotated and the vehicle remains stationary.

However, should the manual selector valve be shifted accidentally during high speed driving from the drive to the neutral position, all the friction elements would be disengaged except the brake 25. The transmission would run by the driving wheels of the vehicle through the output shaft 11, ring gear $R_2$, pinions 19 and sun gear $S_2$ at a speed higher than the output shaft 11 speed because the reverse brake 25 prevents the rotation of the pinion carrier 19, thus possibly causing a damage to the transmission mechanism.

To avoid such a possible damage, according to this invention, the first governor valve 44 is connected directly to the main hydraulic conduit 33 through a conduit 33$a$ as shown by a dotted line in FIG. 2, instead of the connection through the selector valve 38 as shown in FIG. 2. Therefore, during high speed driving, the governor pressure applied through conduit 33 on the end land 59 of the 1–2 shift valve spool 48 maintains its activated position in which the conduit 77 is prohibited from communicating with the conduit 69 and the brake 25 thus remains disengaged.

According to prior art, the governor valve 44 is connected to the main hydraulic conduit 33 only when the selector valve 38 is in the drive, second manual forward speed or first manual forward speed position. However, according to this invention, the governor valve 44 is supplied with a pressurized fluid at all times so far as the oil pump 32 is running, regardless of the position of the manual selector valve 38.

A feature of this invention is, that the 1–2 shift valve 47 has a dual function. In addition to effecting the shifting from the first to the second speed ratio at a predetermined governor pressure, it functions as the control valve by passing a pressurized fluid from the manual selector valve 38 to the motor (not shown) of the reverse brake 25 when the selector valve is in the neutral position but does not pass the pressurized fluid to the motor of the brake 25 if the selector valve happens to be shifted from the drive to the neutral position while the vehicle is driven at a high speed.

The control system described above is understood to be an illustrative system only and that the invention is not to be limited to the specific constructions, arrangements and devices shown.

What is claimed is:

1. In an automatic transmission for a motor vehicle having a driving member, a driven member, a plurality of planetary gear sets drivably connected with said driving and driven members by means of a shaft and clutch and brake means for controlling the relative motion of the planetary gear sets, the clutch and brake means including a reverse high clutch and a low reverse reaction brake for placing the planetary gear sets in reverse drive, a hydraulic control system comprising a source of hydraulic pressure; and a manual selector valve communicating with said source of hydraulic pressure and having a conduit communicating with said low reverse brake when said automatic transmission is set in its neutral position, whereby when the manual selector valve is shifted from neutral to reverse position the reverse high clutch transmits power from the driving member to the sun gear of a planetary gear set and the low reverse reaction brake acts to hold the planet carrier of said gear set stationary so as to cause the ring gear of said gear set and the driven member to rotate in reverse.

2. A hydraulic control system according to claim 1 including governor valve means forming a source of governor pressure and a 1–2 shift valve communicating with said source of governor pressure and with said manual selector valve, said 1–2 shift valve having a valve spool and a speed responsive means for holding said valve spool in a first position when said speed responsive pressure is below a predetermined level and in a second position when said speed responsive pressure exceeds said predetermined level, said valve spool blocking fluid communication between said low reverse reaction brake and said manual selector valve when said 1–2 shift valve is in said second position, whereby said 1–2 shift valve passing pressurized fluid from said manual selector valve to said low reverse reaction brake when said selector valve is in the neutral position and does not pass pressurized fluid to said low reverse reaction brake when said manual selector valve is from the drive to the neutral position when said vehicle is at high speed.

3. In an automatic transmission for a motor vehicle having a driving member; a driven member; a first and second planetary gear set each having toothed members comprising an outer ring gear, at least two planet pinions carried by a carrier and meshing with said outer gear and a sun gear externally meshing with said planet pinions; a shaft connecting said sun gears of said first and second gear sets to each other; shaft means connecting said first and second planetary gear set with said driving member and said driven member, and clutch and brake means for controlling the relative motion of said planetary gear sets, the clutch and brake means including a reverse high clutch and a low reverse reaction brake means for operatively connecting said reverse high clutch and reverse reaction brake to said driving member and the shaft connecting said sun gears for placing the planetary gear sets in reverse drive, a hydraulic control system comprising a source of hydraulic pressure, and a manual selector valve communicating with a source of hydraulic pressure and having a conduit communicating with said low reverse brake when said automatic transmission is set in its neutral position, whereby when the manual selector valve is shifted from neutral to reverse position the reverse high clutch is coupled and transmits power to the sun gear of said second gear set through the brake drum and the reverse reaction brake is applied, the pinion carrier of the second gear set is held stationary by said brake, the pinions of said second gear set idle away causing the outer ring gear of said second gear set and the driven member to reverse direction.

* * * * *